(12) United States Patent
Kamiwada et al.

(10) Patent No.: US 7,856,023 B2
(45) Date of Patent: Dec. 21, 2010

(54) SECURE VIRTUAL PRIVATE NETWORK HAVING A GATEWAY FOR MANAGING GLOBAL IP ADDRESS AND IDENTIFICATION OF DEVICES

(75) Inventors: Toru Kamiwada, Kawasaki (JP); Toshihiro Sonoda, Kawasaki (JP); Jun Kawai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 848 days.

(21) Appl. No.: 11/097,933

(22) Filed: Mar. 31, 2005

(65) Prior Publication Data

US 2005/0169288 A1 Aug. 4, 2005

Related U.S. Application Data

(63) Continuation of application No. PCT/JP03/06432, filed on May 22, 2003.

(51) Int. Cl.
*H04L 12/28* (2006.01)
(52) U.S. Cl. ...................................... 370/401
(58) Field of Classification Search ................ 370/243, 370/392, 401, 400, 351, 244, 352, 230, 420, 370/465, 466, 474, 475, 229, 252, 389, 395.2; 713/153, 160, 184; 709/226, 223, 224, 225, 709/229, 227
See application file for complete search history.

(56) References Cited

U.S. PATENT DOCUMENTS 5,113,499 A * 5/1992 Ankney et al. .............. 340/5.74
5,978,951 A * 11/1999 Lawler et al. ............... 714/758

(Continued)

FOREIGN PATENT DOCUMENTS

JP  11-187061  7/1999

(Continued)

OTHER PUBLICATIONS

Ohmsha, Ltd.; Computer and Network LAN; "Firewalls"; vol. 18, No. 4, Apr. 1, 2000 (with partial translation).

(Continued)

*Primary Examiner*—Kwang B Yao
*Assistant Examiner*—Anh Ngoc Nguyen
(74) *Attorney, Agent, or Firm*—Fujitsu Patent Center

(57) ABSTRACT

A gateway apparatus (100) is capable of connecting to an internal network (10) and an external network (50), and includes an information management unit (120) for managing a global IP address of the gateway apparatus and identification information for a device to be permitted to connect to the internal network. The information management unit transmits the global IP address and the identification information over the external network to an external apparatus. In response to a request received over the external network, the information management unit transmits a one-time password over the external network to the external apparatus. The gateway apparatus further includes: a connector unit (130) permitting the device to connect to the internal network, when it receives a URI containing the global IP address and the one-time password from the device to be permitted to connect over the external network; and an address converter unit (140) for converting between an IP address for the external network into an IP address for the internal network and converting an IP address for the internal network into an IP address for the external network.

14 Claims, 13 Drawing Sheets

U.S. PATENT DOCUMENTS

| | | | |
|---|---|---|---|
| 6,081,900 A * | 6/2000 | Subramaniam et al. | 726/19 |
| 6,393,467 B1 * | 5/2002 | Potvin | 709/217 |
| 6,567,405 B1 * | 5/2003 | Borella et al. | 370/389 |
| 6,618,757 B1 * | 9/2003 | Babbitt et al. | 709/226 |
| 6,715,082 B1 * | 3/2004 | Chang et al. | 726/8 |
| 6,813,715 B2 * | 11/2004 | Yi | 726/15 |
| 7,120,152 B2 * | 10/2006 | Park | 370/395.32 |
| 7,181,612 B1 * | 2/2007 | Pellacuru et al. | 713/153 |
| 2003/0055961 A1 | 3/2003 | Torii | |

FOREIGN PATENT DOCUMENTS

| | | |
|---|---|---|
| JP | 2000-172600 | 6/2000 |
| JP | 2002-032342 | 1/2002 |
| JP | 2002-208965 | 7/2002 |
| JP | 2002-247111 | 8/2002 |
| JP | 2003-30146 | 1/2003 |
| JP | 2003-087332 | 3/2003 |
| JP | 2003-99341 | 4/2003 |

OTHER PUBLICATIONS

Japanese Office Action dated Aug. 12, 2008 for Japanese Application No. 2004-572115.

* cited by examiner

| ADDRESS OF AUTHENTICATION SERVER | 202. 248. xxx. xxx |
|---|---|
| ID FOR REGISTRATION | gw00ffee112233 |
| PASSWORD | ******** |
| AUTOMATIC REGISTRATION | ON |

FIG. 5A

| TERMINAL IDENTIFIER | TERMINAL ID |
|---|---|
| term001 | 001122334455 |
| term002 | 002233445566 |
| term003 | 005544332211 |

FIG. 5B

| GATEWAY ID | PASSWORD | IP ADDRESS | TERMINAL IDENTIFIER | TERMINAL ID |
|---|---|---|---|---|
| gw00ffee112233 | ******** | 164.71.xxx.xxx | term001 | 001122334455 |
| | | | term002 | 002233445566 |
| | | | term003 | 005544332211 |
| gw00ffeeddccbb | ???????? | 218.226.xxx.xxx | father | 00ddbb997766 |
| | | | mother | 00ccaa886644 |
| ... | ... | ... | ... | ... |

FIG. 5C

| REMOTE TERMINAL IP ADDRESSES | PRIVATE IP ADDRESSES OF APPLIANCES | PROTOCOL | TIMES OF LAST PACKET TRANSMISSION/ RECEPTION |
|---|---|---|---|
| 164. 71. xxx. xxx | 218. 225. xxx. xxx | PPTP | 2003/02/11 10:15:32 |
| 164. 72. xxx. xxx | 192. 168. xxx. xxx | SSH | 2003/02/11 10:17:14 |
| . . . | . . . | . . . | . . . |

SECURE VIRTUAL PRIVATE NETWORK HAVING A GATEWAY FOR MANAGING GLOBAL IP ADDRESS AND IDENTIFICATION OF DEVICES

This is a continuation of International Application No. PCT/JP03/06432, filed May 22, 2003.

FIELD OF THE INVENTION

The present invention generally relates to a secure virtual private network with security in access from outside and, in particular, to processing for connecting an external information processing device to a device on an internal network over an external network in accordance with a high security scheme.

BACKGROUND OF THE INVENTION

When an information processing terminal connected to an external network such as the Internet performs remote access to a device connected to an internal network such as a residential local area network, the information processing terminal needs to obtain a global IP address for the external network of a gateway apparatus that intervenes between the internal network and the external network. The information processing terminal uses the obtained IP address as a destination address to access the gateway apparatus.

Usually, a global IP address for a household information processing device for accessing the Internet is dynamically assigned to the information processing device by an Internet service provider (ISP) according to the DHCP (Dynamic Host Configuration Protocol). Thus, the external information processing terminal cannot obtain beforehand the global IP address for the Internet of the gateway apparatus.

In Japanese Patent Application Publication JP 2002-32342 (A) published on Jan. 31, 2002, Maeda has disclosed an authentication system. In this system, when a client inputs a user ID and a password into an information terminal, a dial-up number is obtained so that the information terminal is confirmed. Then, a one-time user ID and a one-time password are generated so that authentication is performed by a firewall server. Accordingly, only authenticated information terminals are allowed to perform data exchange with a host computer via the Internet.

On the other hand, according to a typical method of dynamic DSN service, a gateway apparatus registers its dynamic global IP address with a server having a fixed global IP address for the Internet so that the global IP address of the gateway apparatus is made public. At each time that the global IP address is changed, or alternatively in a regular manner, the gateway apparatus registers or updates its own current global IP address with the server. An external information processing terminal obtains first the dynamic global IP address of the gateway apparatus registered in the server, and then accesses the gateway apparatus using the IP address.

However, when the IP address of a gateway apparatus is registered with a server and made public as described above, the IP address of the gateway apparatus can be known to a third party so that there is a risk that the gateway apparatus can be subject to unauthorized access.

In order to solve this problem, an authentication function may be provided within the server for registration. Then, this server for authentication may determine whether an external information processing terminal has a right to access the gateway apparatus. If it is determined that the terminal has such a right to access, the server transmits to the external information processing terminal a unique URI (Uniformed Resource Identifier) or URL for a WWW service provided by the gateway apparatus. Thus, the server can securely notify the external information processing terminal of the IP address of the gateway apparatus. The external information processing terminal can use the URI to access the WWW service. Thus, the gateway apparatus is secured against unauthorized access by a third party.

The inventors have recognized a problem that, in the above-mentioned method, the external information processing terminal can access only WWW services in the gateway apparatus, but cannot use services oriented toward the internal network devices.

Meanwhile, a server function of a virtual private network (VPN) may be provided within a gateway apparatus. The server function may be adapted so that, when an external information processing terminal attempts a connection over the Internet, a virtual connection is established between the external information processing terminal and the internal network, so that the internal network-oriented service in the gateway apparatus is provided to the external information processing terminal. For this purpose, the external information processing terminal may obtain the IP address of the gateway apparatus in a secure manner from the authentication server as described above. However, while the VPN server function is providing a service to the outside over the Internet, there is a risk that the VPN server can be subject to unauthorized access by a third party to penetrate the internal network. Further, in general, authentication with a password and the like is performed before the VPN connection is established. In this case, different passwords are required for different services. Thus, the number of passwords to be remembered by a user increases with increasing number of services requiring authentication. Thus, the user may forget a password.

The inventors have recognized a need that without increasing user's time and work, a VPN server function of a gateway apparatus should allow an external information processing terminal to more securely access an internal network device-oriented service.

An object of the invention is to allow an internal network device-oriented service to be more securely provided to an external information processing device.

SUMMARY OF THE INVENTION

In accordance with an aspect of the present invention, a gateway apparatus is capable of connecting to an internal network and an external network, and includes an information management unit for managing a global IP address of the gateway apparatus and identification information for a device to be permitted to connect to the internal network. The information management unit transmits the global IP address and the identification information over the external network to an external apparatus. In response to a request received over the external network, the information management unit transmits a one-time password over the external network to the external apparatus. The gateway apparatus further includes: a connector unit permitting the device to connect to the internal network, when it receives a URI containing the global IP address and the one-time password from the device to be permitted to connect over the external network; and an address converter unit for converting an IP address for the external network into an IP address for the internal network and converting an IP address for the internal network into an IP address for the external network.

The invention relates to a program for implementing the gateway apparatus described above.

The invention also relates to a method for providing the gateway apparatus described above.

According to the invention, an internal network device-oriented service can be more securely provided to an external information processing device.

Throughout the drawings, similar symbols and numerals indicate similar items and functions.

BRIEF DESCRIPTION OF THE DRAWINGS

FIG. 5A shows information which is stored in the authentication server registration information storage section and is used for registering specific information of the gateway apparatus into the authentication server;

FIG. 5B shows specific information of remote terminals which is stored in the remote terminal information storage section and is to be registered with the authentication server;

FIG. 5C shows gateway management information which is registered by the gateway apparatus with the authentication server and is to be stored in the gateway management information storage section;

DESCRIPTION OF THE PREFERRED EMBODIMENTS

Figure 1:
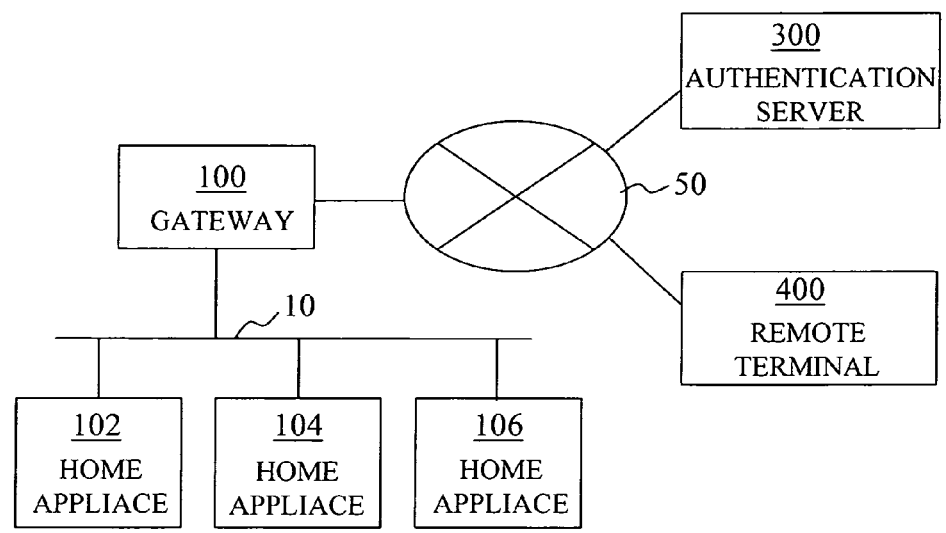
FIG. 1 schematically shows a system including a residential gateway apparatus, home appliances, a authentication server, and a remote information processing terminal, in accordance with an embodiment of the present invention.

FIG. 1 schematically shows a system including a residential gateway apparatus 100, home appliances or devices 102, 104, and 106, an authentication server 300, and a remote information processing terminal 400, in accordance with an embodiment of the present invention. The residential gateway apparatus 100 and the home appliances 102-106 are configured or connected to a residential local area network (LAN) 10. Each of the home appliances 102-106 may be a personal computer, a file server, a facsimile machine, a refrigerator, an air conditioner, or a video recording and reproducing device, for example. The gateway apparatus 100, the authentication server 300 and the remote information processing terminal 400 are connected to the Internet 50 as an external network.

The gateway apparatus 100 is permanently connected to the Internet 50 via an ADSL, an ISDN line, a leased line, or the like. The remote information processing terminal 400 may be a fixed or mobile information processing terminal such as a desktop personal computer (PC), a notebook PC, a PDA (Personal Digital Assistant) and a mobile telephone, which may be connected to the Internet 50 over a dial-up or permanent connection. Typically, the global IP address for the Internet 50 of the gateway apparatus 100 is dynamically assigned by an Internet service provider. When a global IP address is assigned, the gateway apparatus 100 registers the global IP address with the authentication server 300 in a predetermined timing.

In response to an access from the remote information processing terminal 400, the authentication server 300 performs authentication for a remote access to the gateway apparatus 100, and then provides to the remote terminal 400 the global IP address and other information of the gateway apparatus 100 for the Internet 50. Using these IP address and other information, the remote terminal 400 accesses the gateway apparatus 100 and the home appliances 102-106. The global IP address for the Internet 50 of the authentication server 300 is assigned in a fixed manner.

The gateway apparatus 100 establishes VPN connections between the remote terminal 400 and the home appliances 102 and 104 on the Internet protocol (IP) over the residential LAN 10 and the Internet 50. Then, the gateway apparatus 100 performs IP address conversion on IP packets transferred between the LAN 10 and the Internet 50, to thereby form a virtual private network (VPN).

Figure 2:
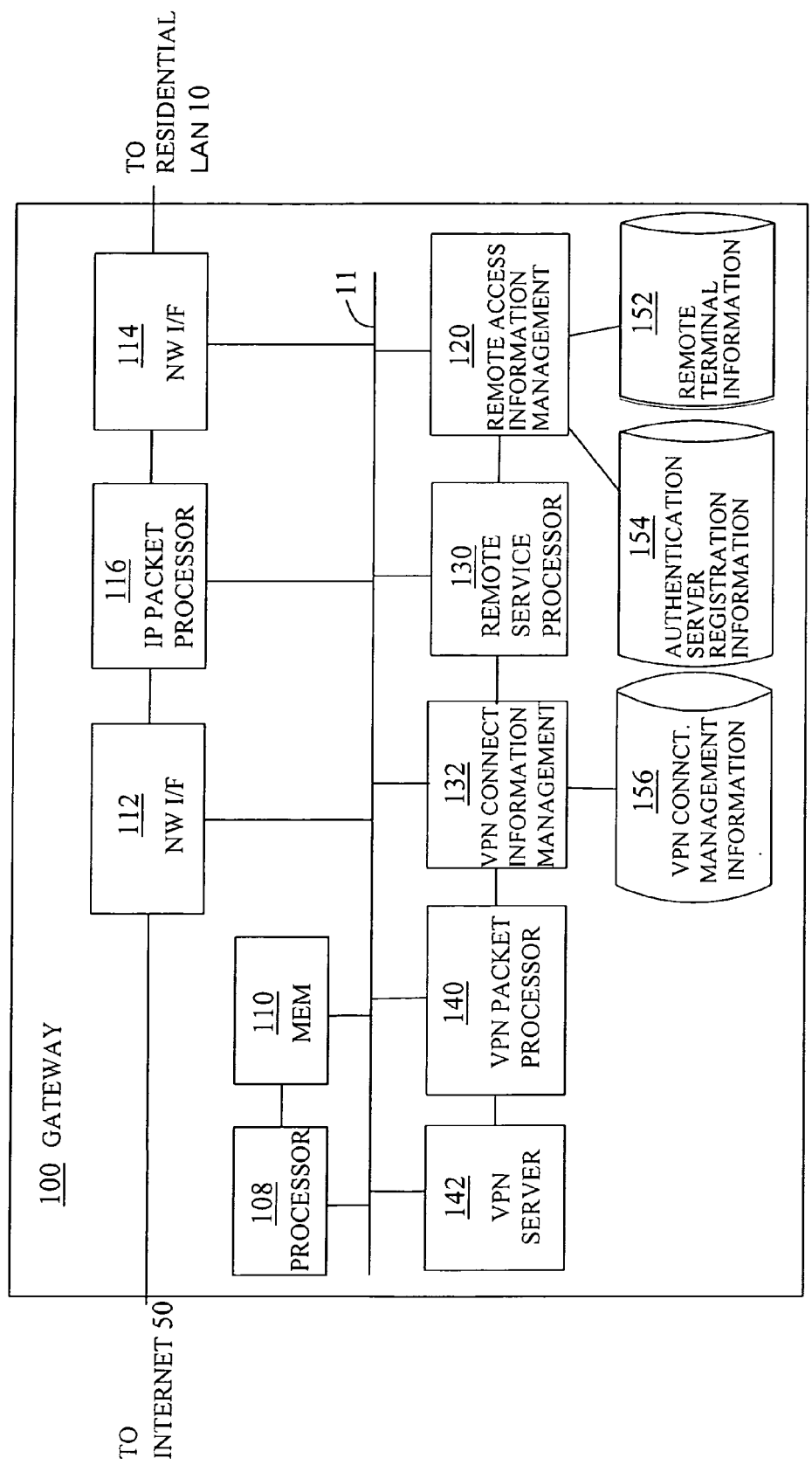
FIG. 2 shows the configuration of a gateway apparatus in accordance with the embodiment of the invention.

FIG. 2 shows the configuration of a gateway apparatus 100 in accordance with the embodiment of the invention. In FIG. 2, the gateway apparatus 100 includes: a network interface (NW I/F) 112 connected to the Internet 50; a network interface (NW I/F) 114 connected to the residential LAN 10; an IP packet processor 116 connected to the network interfaces 112 and 114; a remote access information management section 120 connected to the network interface 114; a remote service processor 130 connected to the IP packet processor 116 and the information management section 120; a VPN packet processor 140 connected to the IP packet processor 116; a VPN connection information management section 132 connected to the remote service processor 130 and the VPN packet processor 140; and a VPN server section 142 connected to the VPN packet processor 140. The gateway apparatus 100 further includes: a remote terminal information storage section 152 and an authentication server registration information storage section 154 which are connected to the remote access information management section 120; and a VPN connection management information storage section 156 connected to the VPN connection information management section 132.

The components 112-142 may be interconnected through an internal bus 11. The functions of the components 116-142 may be performed by a processor 108 in accordance with a program stored in a memory 110, and thereby may be implemented on the processor 108. The storage sections 152-156 may be composed of storage areas in the memory 110.

Figure 3:
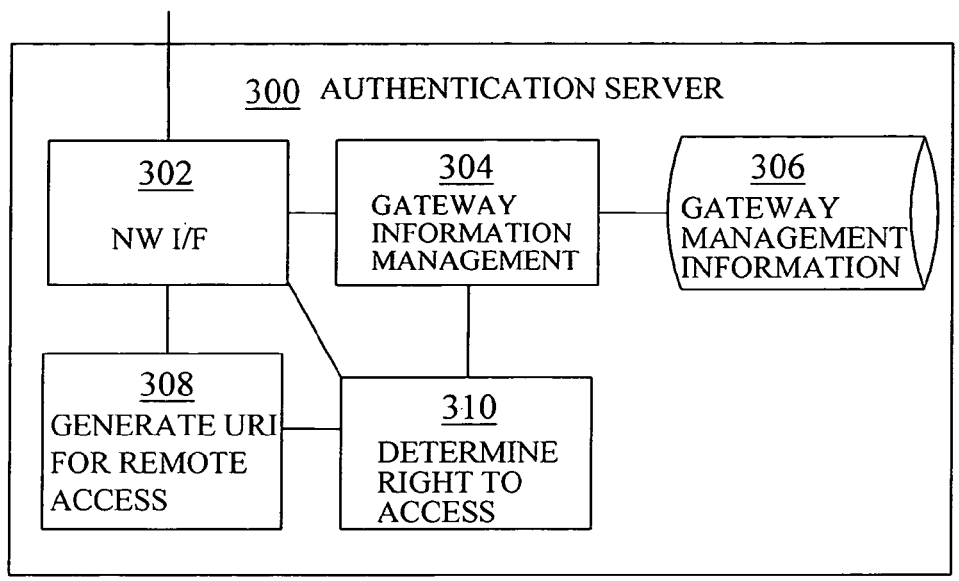
FIG. 3 shows the configuration of an authentication server in accordance with the embodiment of the invention.

FIG. 3 shows the configuration of an authentication server 300 in accordance with the embodiment of the invention. The authentication server 300 includes: a network interface (NW I/F) 302 connected to the Internet 50; a gateway information management section 304; a remote access URI generation unit 308; and an access right determination unit 310.

Figure 4:
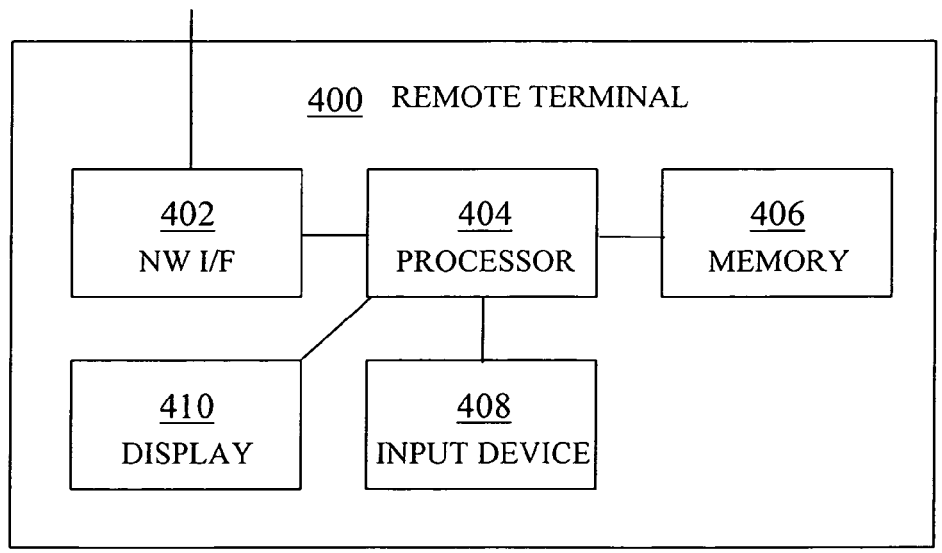
FIG. 4 shows the configuration of a remote information processing terminal in accordance with the embodiment of the invention.

FIG. 4 shows the configuration of a remote information processing terminal 400 in accordance with the embodiment of the invention. In FIG. 4, the remote terminal 400 includes: a network interface (NW I/F) 402 connected to the Internet 50, for example, over a mobile wireless telephone network through a dial-up connection; a processor 404; a memory 406; an input unit 408; and a display unit 410.

In order to implement a VPN, a user connects the home appliances 102-106 to the gateway apparatus 100 through the LAN 10, and then stores specific or unique information related to the home appliances 102-106 into the VPN connection management information storage section 156 of the gateway apparatus 100. Then, the user operates any one of the home appliances 102-106 and the gateway apparatus 100, and thereby issues to the remote terminal 400 a request for transmitting specific or unique information related to the remote terminal 400 via a message such as an electronic mail. When the information is obtained from the remote terminal 400 via a message such as an electronic mail, the information is stored into the remote terminal information storage section 152 of the gateway apparatus 100. The message is preferably encrypted. Then, the gateway apparatus 100 transmits to the remote terminal 400 the specific or unique information related to the gateway apparatus 100 and identification information assigned to the remote terminal 400 via a message such as an electronic mail. The remote terminal 400 stores, into its memory 406, the specific information of the gateway apparatus 100 and the identification information assigned to the remote terminal 400.

Then, automatically, or in response to an instruction issued in accordance with a user operation of any one of the home appliances 102-106 and the gateway apparatus 100, the gateway apparatus 100 connects to the authentication server 300 over the Internet 50, and then registers the specific information of the gateway apparatus 100 and the remote terminal information with the authentication server 300. The gateway apparatus 100 dynamically assigns private IP addresses to the home appliances 102-106.

FIG. 5A shows information which is stored in the authentication server registration information storage section 154 and is used for registering the specific information of the gateway apparatus 100 with the authentication server 300. The information includes: the DNS name or fixed global IP address of the authentication server 300; an ID for the registration of the gateway apparatus 100; a password used for access from the remote terminal to the authentication server 300; and information indicating whether the dynamic global IP address of the gateway apparatus 100 should be automatically registered with the authentication server 300 for updating. The registration IDs are unique character strings used by the authentication server 300 for identifying different gateway apparatuses. For example, the ID may be generated by the gateway apparatus in accordance with the MAC address or the product serial number of the gateway apparatus. The password and the positive or negative selection (ON/OFF) of the automatic registration may be determined by the user of the gateway apparatus 100 and the LAN 10.

FIG. 5B shows specific information of remote terminals 400 which is stored in the remote terminal information storage section 152 and is to be registered with the authentication server 300. The information includes terminal identifiers and terminal IDs. Each terminal identifier may be a meaningful character string inputted by a user. Each terminal ID is a unique character string used by the authentication server 300 for identifying the different remote terminals. For example, the ID may be generated by the gateway apparatus in accordance with the unique information such as the MAC address of the remote terminal.

FIG. 5C shows gateway management information which is registered by the gateway apparatus 100 with the authentication server 300 and is to be stored in the gateway management information storage section 306. Before the gateway management information is registered by the gateway apparatus 100, the information contains only the gateway ID and the password for the gateway apparatus 100. After the registration, the information includes: the gateway ID, the password, and the dynamically changed global IP address of the gateway apparatus 100; and the identifiers and the IDs of the remote terminals.

Figure 6:
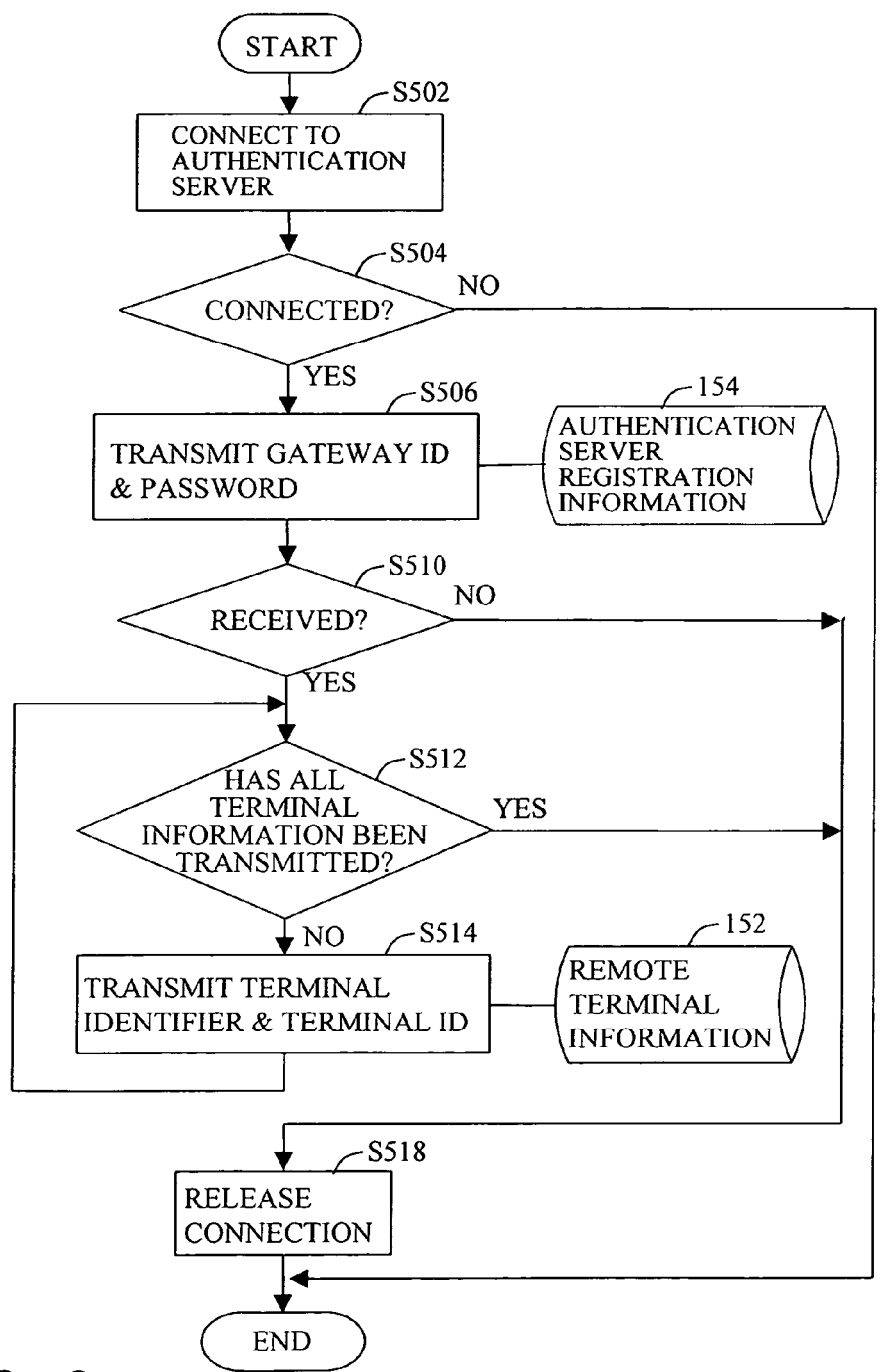
FIG. 6 is a flow chart for registering identification of the gateway apparatus with the authentication server, which is performed by the remote access information management section of the gateway apparatus.

FIG. 6 is a flow chart for registering identification of the gateway apparatus 100 with the authentication server 300, which is performed by the remote access information management section 120 of the gateway apparatus 100.

Referring to FIG. 6, at Step 502, the remote access information management section 120 attempts to connect to the authentication server 300 over the Internet 50. At Step 504, the remote access information management section 120 determines whether a connection is established. If it is determined that a connection is not established, the procedure exits from the routine of FIG. 6.

If it is determined at Step 504 that a connection is established, the remote access information management section 120 at Step 506 refers to the authentication server registration information 154 and transmits the gateway ID and the password to the authentication server 300. At Ste 510, the remote access information management section 120 determines whether the gateway ID and the password have been accepted by the authentication server 300. If it is determined that the information has not been accepted, the remote access information management section 120 at Step 518 terminates or releases the connection. Then, the procedure exits from the routine of FIG. 6.

If it is determined that the information has been accepted at Step 510, the remote access information management section 120 at Step 512 determines whether all the terminal information relevant to the gateway apparatus 100 has been transmitted. If it is determined that all the information has been transmitted, the remote access information management section 120 at Step 518 releases the connection. Then, the procedure exits from the routine of FIG. 6.

If it is determined at Step 512 that the terminal identifiers and the terminal IDs of all the terminals have not yet been transmitted, the remote access information management section 120 at Step 514 refers to the remote terminal information 152 and transmits a terminal identifier and a terminal ID to the authentication server 300. Then, the procedure returns to Step 512. The routine of Steps 512-514 is repeated until the terminal identifiers and the terminal IDs of all the terminals have been transmitted.

Figure 7A:
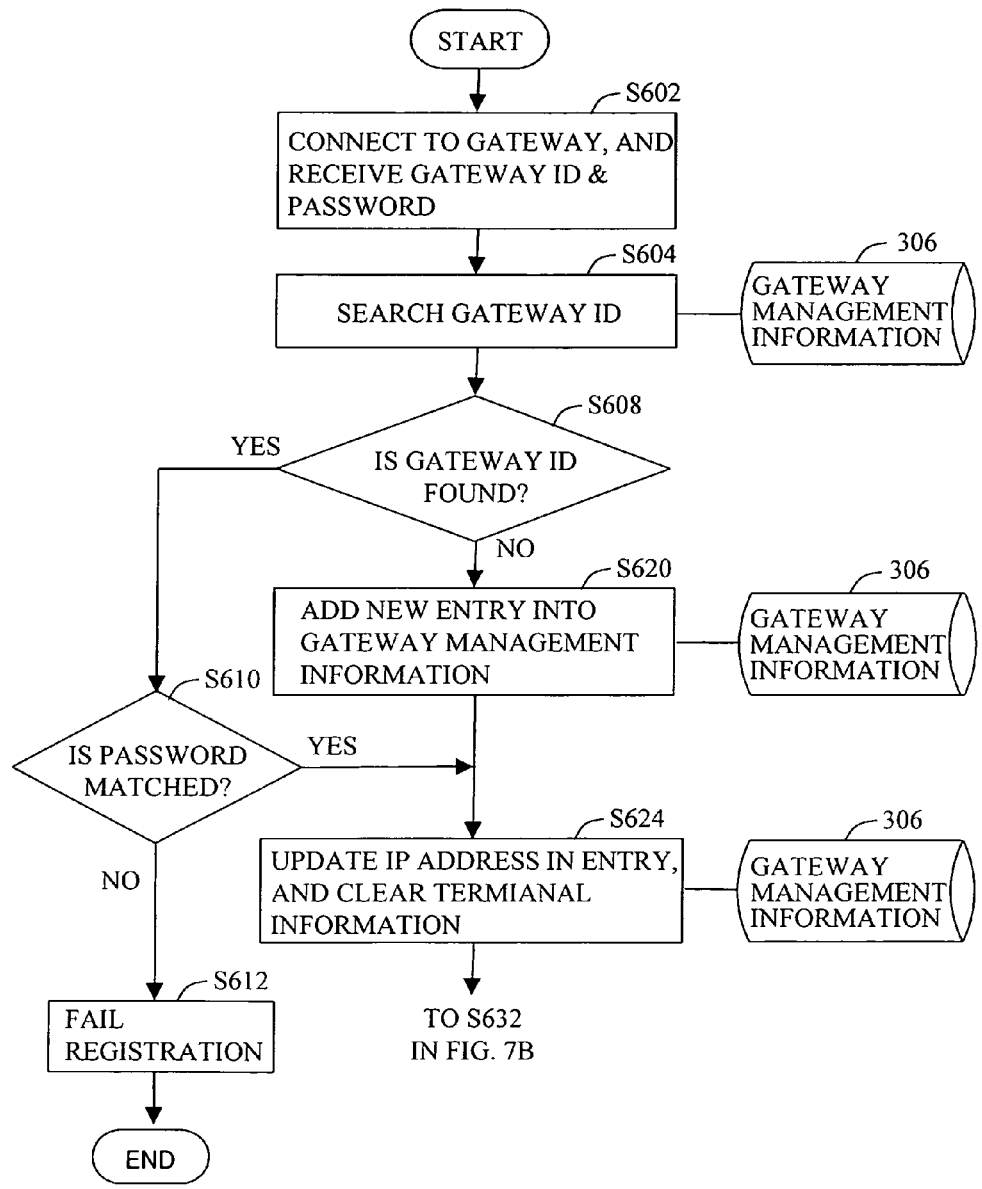
FIGS. 7A and 7B are a flow chart for registering the related information of the gateway apparatus with the authentication server, which is performed by the gateway information management section of the authentication server.
Figure 7B:
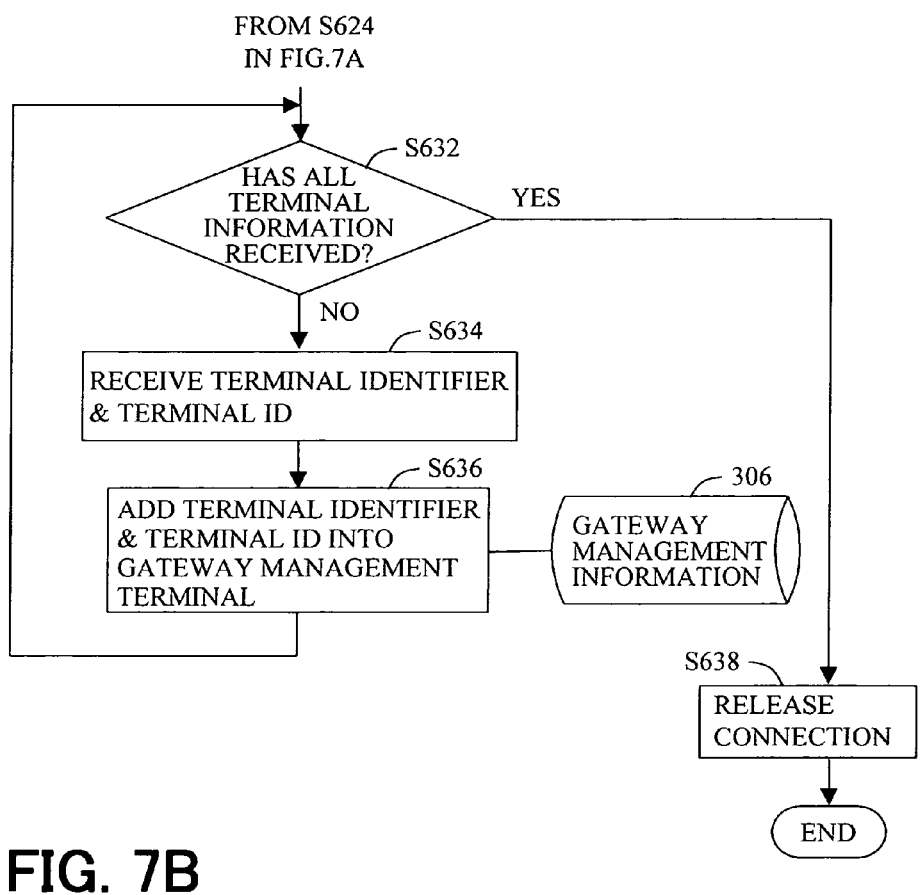

FIGS. 7A and 7B are a flow chart for registering the related information of the gateway apparatus 100 with the authentication server 300, which is performed by the gateway information management section 304 of the authentication server 300.

Referring to FIG. 7A, at Step 602, the gateway information management section 304 is connected by the gateway apparatus 100 to the gateway apparatus 100, and then at Step 604 allows the gateway apparatus 100 to search the gateway management information 306.

At Step 608, the gateway information management section 304 determines whether the gateway ID has been found. If it is determined that the gateway ID has been found, the gateway information management section 304 at Step 610 determines whether the received password matches with the password related to the gateway ID in the gateway management information 306. If it is determined that the password does not match with the registered one, the gateway information management section 304 at Step 612 notifies the gateway apparatus 100 of the failure of registration. Then, the procedure exits from the routine of FIG. 7A. If it is determined that the password matches with the registered one, the procedure goes to Step 624.

If it is determined at Step 608 that the gateway ID has not been found, the gateway information management section 304 at Step 620 generates a new entry for the gateway apparatus 100, and then adds the entry to the gateway management information 306. Then, the procedure goes to Step 624.

At Step 624, the gateway information management section 304 updates the IP address in the entry of the gateway apparatus 100 in the gateway management information 306, and clears or deletes the terminal information.

Referring to FIG. 7B, at Step 632, the gateway information management section 304 determines whether all the terminal identifiers and the terminal IDs relevant to the gateway apparatus 100 as illustrated in FIG. 5B have been received. If all the information has been received, the gateway information management section 304 at Step 638 releases the connection. Then, the procedure exits from the routine of FIGS. 7A and 7B.

If it is determined that all the information has not yet been received, the gateway information management section 304 at Step waits 634 for the reception of a terminal identifier and a terminal ID. At Step 636, the gateway information management section 304 adds the received terminal identifier and terminal ID to the gateway management information 306. The routine of Steps 632-636 is repeated until all the terminal identifiers and the terminal IDs have been received.

Figure 8A:
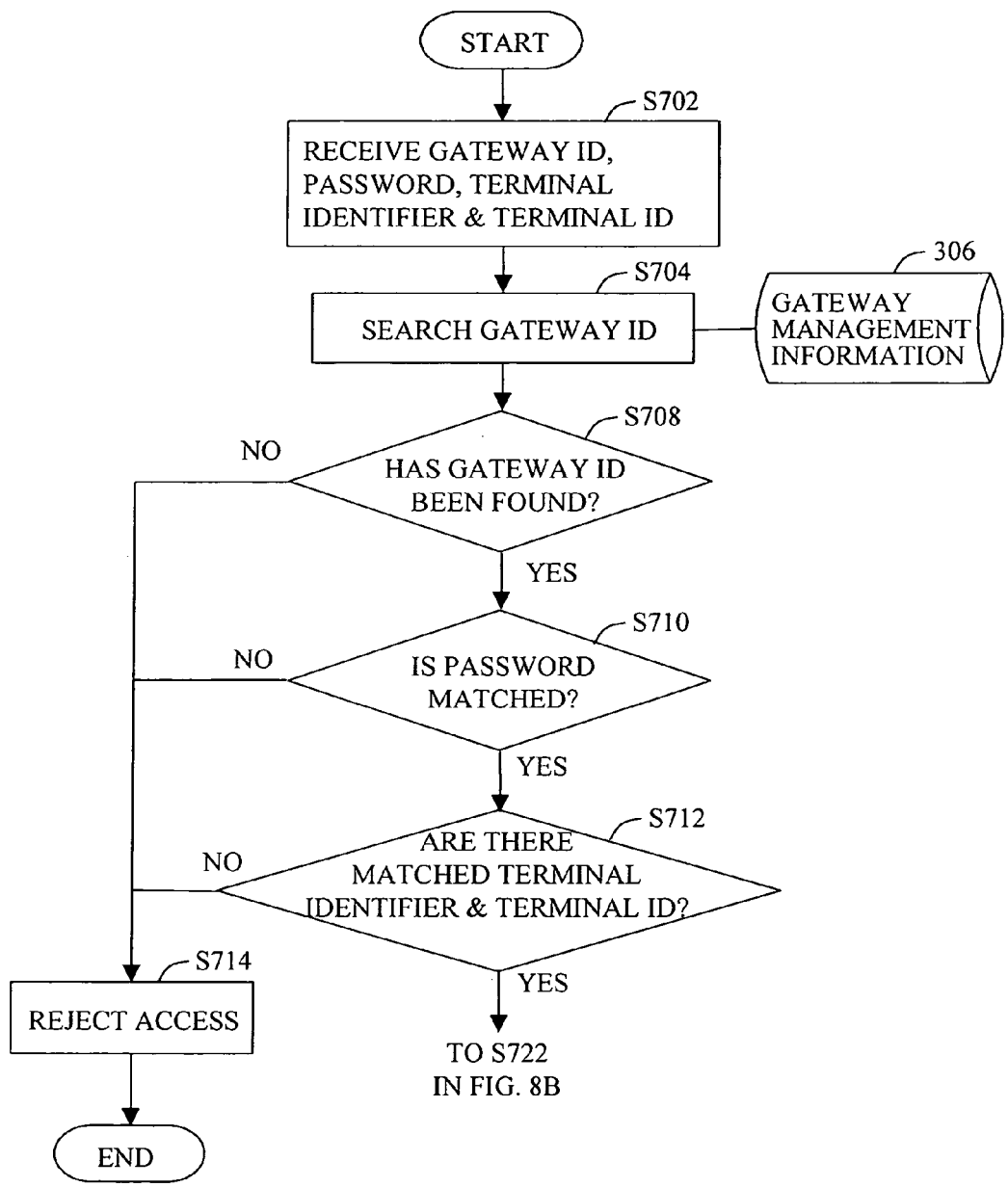
FIGS. 8A and 8B are a flow chart for authenticating the remote information processing terminal and then notifying the remote information processing terminal of a URI for the gateway apparatus, which is performed by the gateway information management section of the authentication server.
Figure 8B:
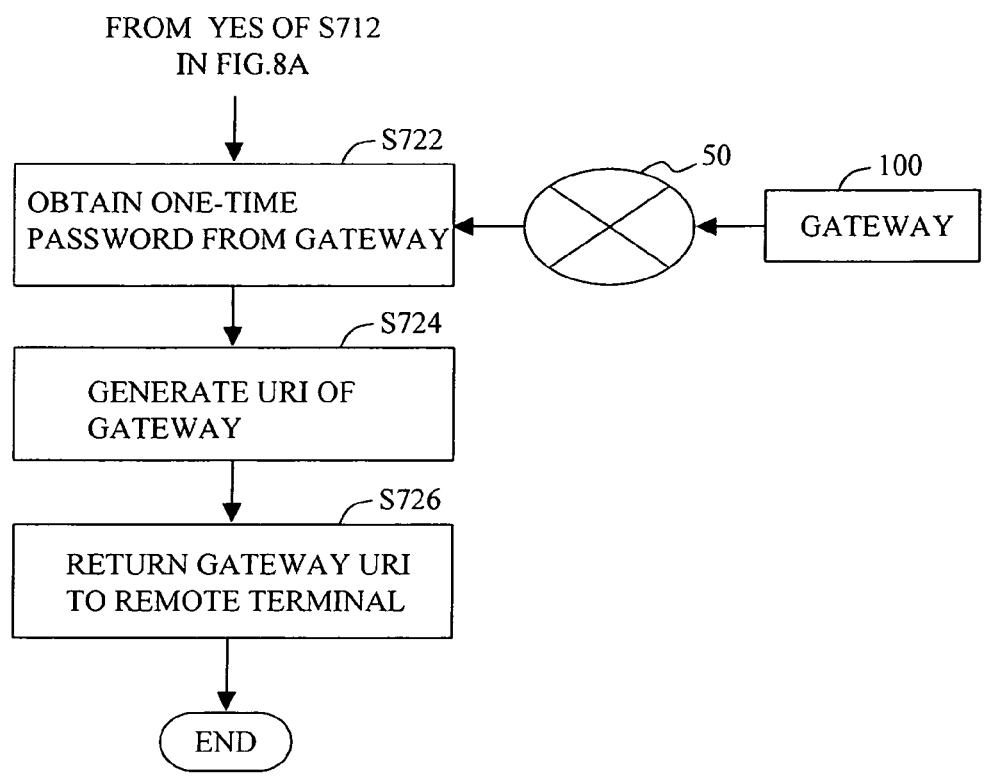

FIGS. 8A and 8B are a flow chart for authenticating the remote information processing terminal 400 and then notifying the remote information processing terminal 400 of a URI for the gateway apparatus 100, which is performed by the gateway information management section 304 of the authentication server 300.

As described above, the remote information processing terminal 400 receives beforehand, from the gateway apparatus 100, the ID and the password of the gateway apparatus 100 as well as the terminal identifier and the terminal ID of the remote terminal 400 generated by the gateway apparatus 100. Then, the gateway apparatus 100 stores the information in the memory 406 beforehand.

Referring to FIG. 8A, at Step 702, the gateway information management section 304 accepts an access from the remote information processing terminal 400 over the Internet 50, and then receives from the remote terminal 400 the ID and the password of the gateway apparatus 100 as well as the terminal identifier and the terminal ID. At Step 704, the gateway information management section 304 searches the gateway management information 306 for a gateway ID as a corresponding entry.

At Step 708, the gateway information management section 304 determines whether a corresponding gateway ID has been found in the gateway management information 306. If it is determined that no ID has been found, the gateway information management section 304 at Step 714 rejects the access from the remote terminal 400.

If it is determined that an ID has been found, the gateway information management section 304 at Step 710 compares the received password with the password stored in the gateway management information 306, to thereby determine whether the received password matches with the password in the management information 306. If it is determined that the password does not match with the registered one, the procedure goes to Step 714.

If it is determined that the password matches with the registered one, the gateway information management section 304 at Step 712 determines whether a terminal identifier and a terminal ID corresponding to the received terminal identifier and terminal ID are present in the gateway management information 306. If it is determined that corresponding ones are not present, the procedure goes to Step 714 of FIG. 8B.

Referring to FIG. 8B, if it is determined that corresponding ones are present, the gateway information management section 304 at Step 722 accesses the gateway apparatus 100 over the Internet 50, to thereby obtain a one-time password from the gateway apparatus 100. In response to a request from the authentication server 300, the remote service processor 130 of the gateway apparatus 100 generates a one-time password at random, and then transmits the password to the authentication server 300. Then, the VPN connection information management section 132 stores the one-time password into the VPN connection management information storage section 156.

At Step 724, the gateway information management section 304 combines the received one-time password with the login information (such as the global IP address) for the gateway apparatus 100, to thereby generate a URI (e.g., http://210.140.120.128/index.cgi?data=...) for a Web page of the gateway apparatus 100. At Step 726, the gateway information management section 304 transmits the URI for the Web page of the gateway back to the remote terminal 400.

Figure 9:
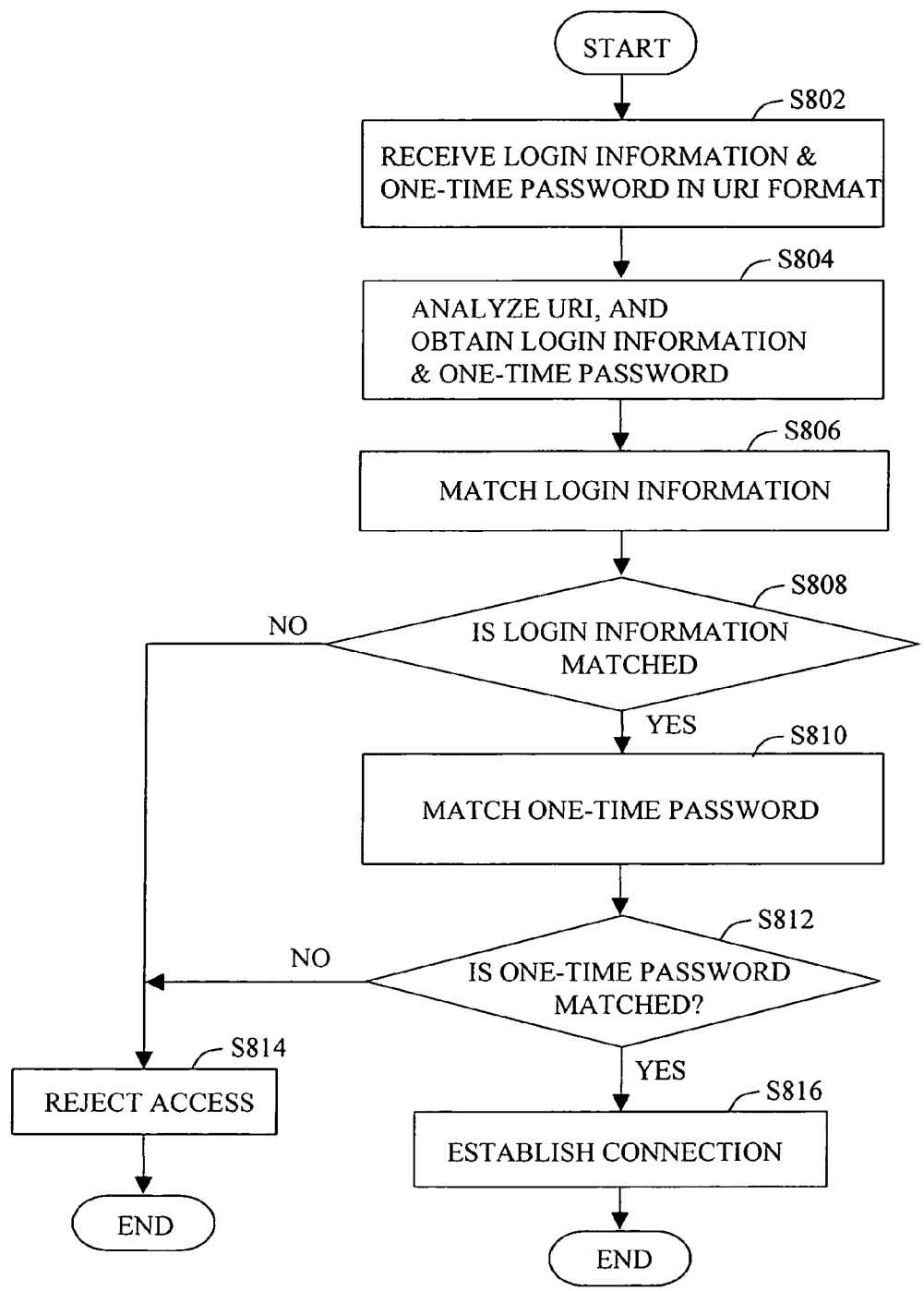
FIG. 9 is a flow chart for authenticating the remote information processing terminal for connecting the remote information processing terminal to the gateway apparatus, which is performed by the remote service processor of the gateway apparatus.

FIG. 9 is a flow chart for authenticating the remote information processing terminal 400 for connecting the remote information processing terminal 400 to the gateway apparatus 100, which is performed by the remote service processor 130 of the gateway apparatus 100.

The remote terminal 400 transmits, to the gateway apparatus 100 over the Internet 50, a URI for a Web page of the gateway apparatus which has been received from the authentication server 300.

At Step 802, the remote service processor 130 receives the URI for the Web page from the remote terminal 400. At Step 804, the remote service processor 130 parses the URI to thereby extract login information and a one-time password from the URI. At Step 806, the remote service processor 130 compares the received login information with the login information stored in the VPN connection management information storage section 156. At Step 808, the remote service processor 130 determines whether the received login information matches with the login information stored in the VPN connection management information storage section 156. If it is determined that the information does not match with the stored one, the procedure goes to Step 814.

If it is determined that the information matches with the stored one, the remote service processor 130 at Step 810 compares the one-time password with the one-time password stored in the VPN connection management information storage section 156. At Step 812, the remote service processor 130 determines whether the received one-time password matches with the one-time password stored in the VPN connection management information storage section 156. If it is determined that the password does not match with the stored one, the procedure goes to Step 814. If it is determined that the password matches with the stored one, the remote service processor 130 at Step 816 establishes a connection with the remote terminal 400 and then invalidates, from that time on, the one-time password stored in the VPN connection management information storage section 156.

Figure 10:
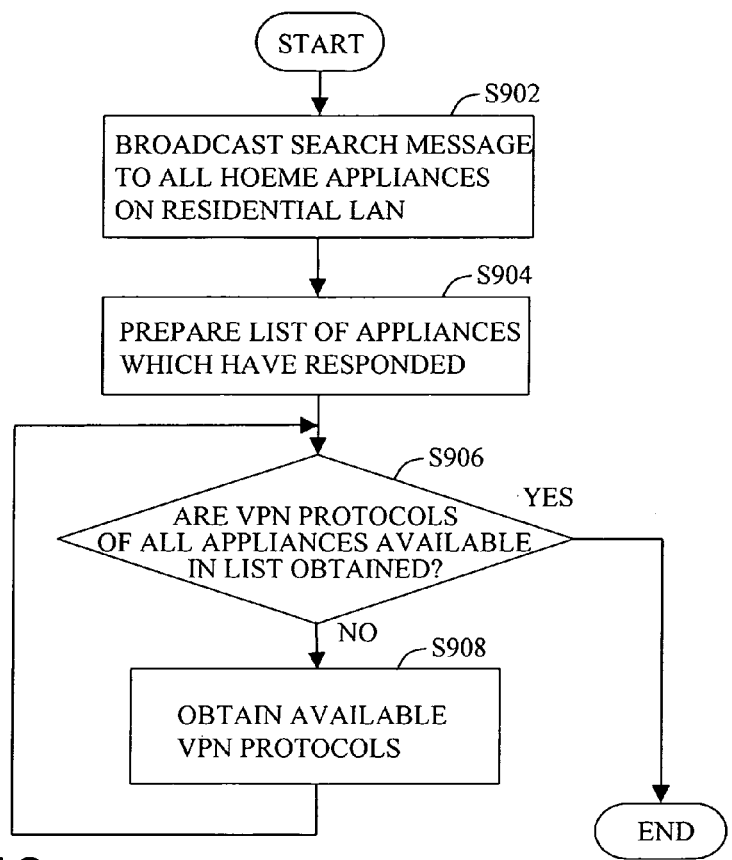
FIG. 10 is a flow chart for acquiring VPN protocols available for generating a VPN connection menu as a Web page displayed on the remote terminal, which is performed by the remote service processor of the gateway apparatus.

FIG. 10 is a flow chart for acquiring VPN protocols available for generating a VPN connection menu as a Web page displayed on the remote terminal 400, which is performed by the remote service processor 130 of the gateway apparatus 100.

Referring to FIG. 10, at Step 902, the remote service processor 130 broadcasts a search message to all the devices or home appliances on the residential LAN 10. In response to the search message, among the home appliances 102, 104, and the like configured to the LAN 10, ones of the home appliances that can form a VPN transmit back to the remote service processor 130 respective response messages, each containing a private IP address and a device or appliance identification. At Step 904, the remote service processor 130 generates a list of home appliances 102 and 104 that represents sources of the received response messages, i.e., a list of the home appliances that can form a VPN.

At Step 906, the remote service processor 130 determines whether a list of available VPN protocols has been obtained for all the home appliances in the list of the home appliances. Initially no list is obtained. Thus, the procedure goes to Step 908. At Step 908, the remote service processor 130 obtains, via the VPN connection information management section 132, a list of all available VPN protocols of the home appliances in the VPN connection management information storage section 156. Then, the procedure returns to Step 906. If it is determined at Ste 906 that the list of available VPN protocols has been obtained from all the home appliances, the procedure exits from the routine of FIG. 10.

Figure 11:
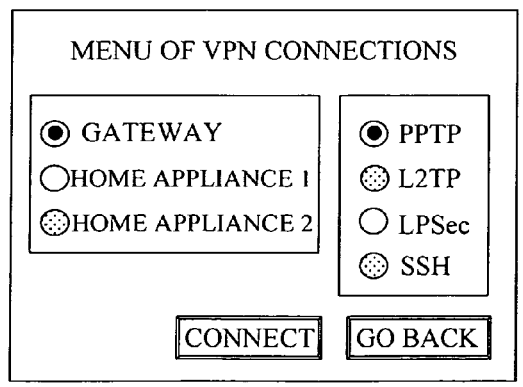
FIG. 11 shows an example of a menu of connectable home appliances which is transmitted as a Web page from the remote service processor of the gateway apparatus to the remote terminal for displaying on the display unit.

FIG. 11 shows an example of a menu of connectable home appliances which is transmitted as a Web page from the remote service processor 130 of the gateway apparatus 100 to the remote terminal 400 for displaying on the display unit 410. After a connection is established with the remote terminal 400 as shown in FIG. 9 (Step 816), the remote service processor 130 transmits a menu of connectable home appliances generated in accordance with the list of the VPN protocols to the remote terminal 400 for displaying thereon. In FIG. 11, a shaded circle symbol indicates an item that cannot be selected, while a not-shaded circle symbol indicates an item which may be selected. A circle symbol containing a filled circle indicates an item selected by the user.

The user of the remote terminal 400 selects a home appliance (e.g., the home appliance 102) desired to be connected and a protocol (e.g., PPTP) desired to be used, from the menu displayed on the display unit 408. The user then selects a software key "CONNECT" and thereby accesses the selected home appliance. In the figure, the selected item is indicated by a filled circle. Default indication may be used for a protocol desired to be used.

If a VPN connection is initiated, the VPN packet processor 140 of the gateway apparatus 100 prepares communication between the selected home appliance (102) and the remote terminal 400.

Conventionally, in order to prevent unauthorized access, the IP packet processor 116 of the gateway apparatus 100 filters out and rejects such packets that include: an IP protocol number (such as "1" for ICMP, "6" for TCP, "17" for UDP, and "47" for GRE) which is not required in the service provided to the external terminal by the gateway apparatus 100; and a port number for TCP, UDP or the like.

Among the packets received from the remote terminal 400, the VPN packet processor 140 converts the protocol of a packet addressed to the selected home appliance 102, and then transfers the packet to the LAN 10. For this purpose, among the packets received from the remote access terminal 400 by the gateway apparatus 100, the VPN packet processor 140 changes the description of a packet that includes an IP protocol number used for the VPN connection and a port number for TCP or UDP and that is rejected by the IP packet processor 116, into a form acceptable to the gateway apparatus 100. Further, in order to permit an access to the home appliance on the residential LAN 10, the VPN packet processor 140 converts the identification of the selected home appliance 102 into a private IP address by an address conversion process such as NAT. The VPN packet processor 140 transfers the packet with the converted address to the IP packet processor 116 to thereby transmit the packet to the selected home appliance 102 over the LAN 10 via the network interface 114.

The information used for the VPN packet processing in the gateway apparatus 100 is stored beforehand into the VPN connection management information storage section 156 by the VPN connection information management section 132.

When the VPN connection is released in response to an instruction by the user through the remote terminal 400 or in response to an explicit instruction from any one of the home appliances 102-106 as a destination for the VPN connection or from the VPN server 132 of the gateway apparatus 100, the VPN packet processor 140 causes the VPN connection information management section 132 to delete the corresponding entry from the VPN connection management information storage section 156 and reset the corresponding setting in the VPN connection management information 126 related to the corresponding VPN packet. This prevents VPN packets from entering from the remote terminal 400 into the gateway apparatus 100 and the LAN 10 from that time on. When the user intends to reconnect the remote terminal 400 to the home appliances 102-106 or the VPN server 156, the connection procedure described above is performed again, so that it is required to obtain a URI of the gateway apparatus 100 including another one-time password.

In the gateway apparatus 100, during the VPN connection, the VPN connection information management section 132 continuously monitors the presence or absence of a VPN packet provided to the IP packet processor 116, while referring to times of the last packet transmission and reception in the VPN connection management information 126. When no packet for the VPN does not flow for a predetermined period of time or longer, the VPN connection information management section 132 may assume that the VPN connection is not used, so that the VPN connection is released.

Figures 12, 13A:
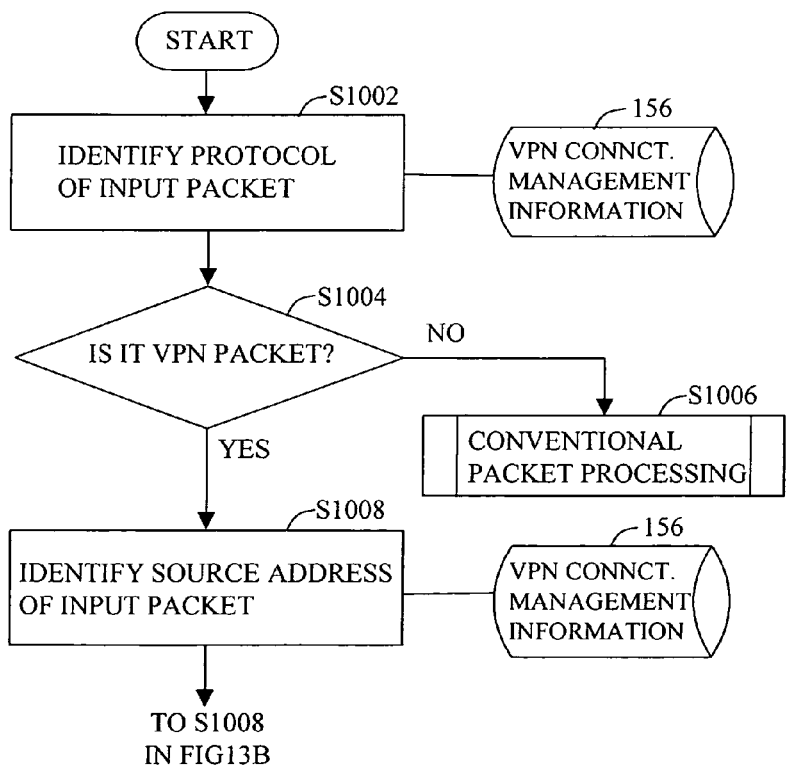
FIG. 12 shows an example of records of VPN connection management information to be stored in the VPN connection management information storage section.
FIGS. 13A and 13B are a flow chart for processing a VPN packet, which is performed by the IP packet processor and the VPN packet processor of the gateway apparatus.

FIG. 12 shows an example of records of VPN connection management information stored in the VPN connection management information storage section 156. The stored information may includes the IP addresses of remote terminals, the private IP addresses of the connected home appliances, the identifications of the VPN protocols, and the dates and times of initiating connection.

Figure 13B:
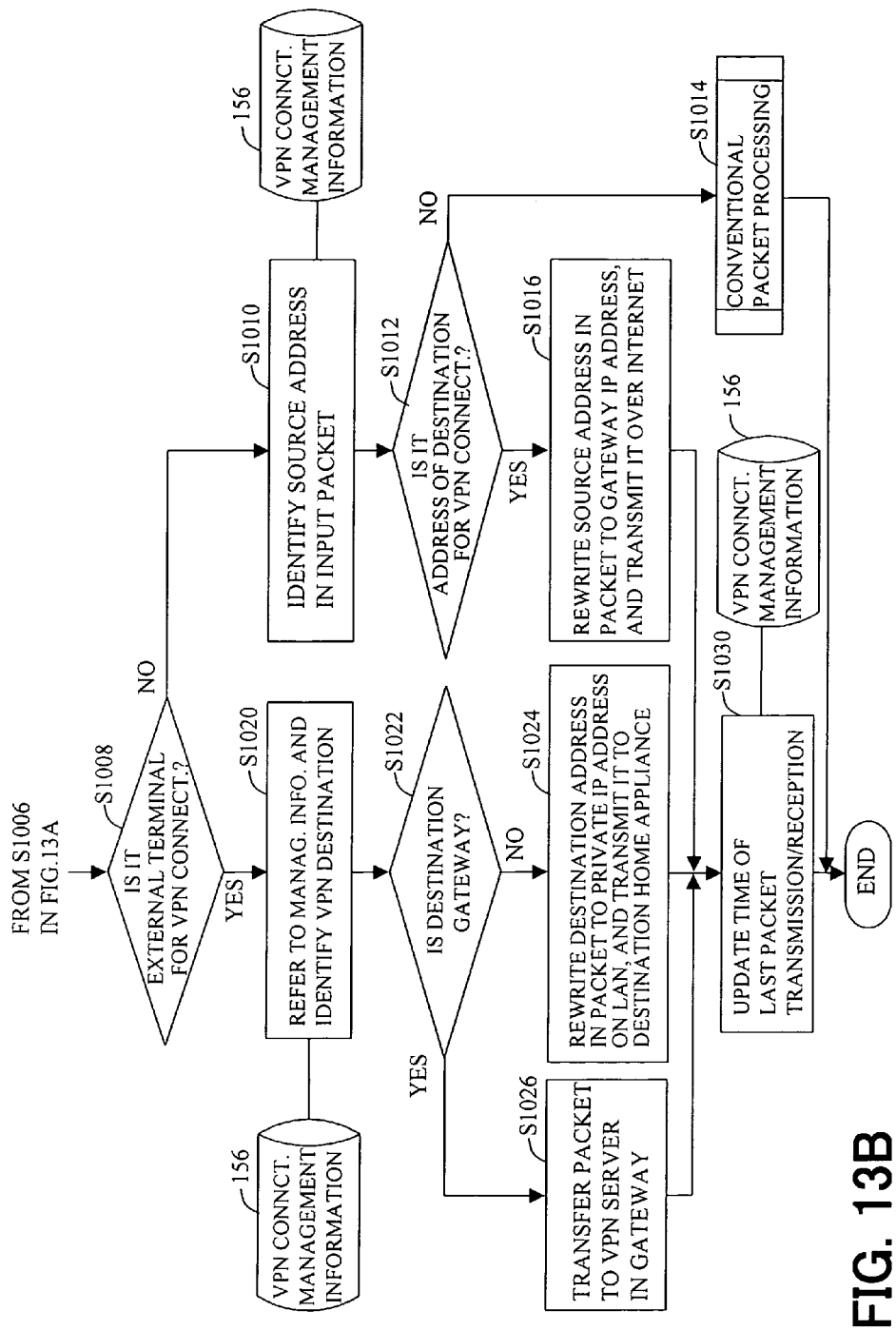

FIGS. 13A and 13B are a flow chart for processing a VPN packet, which is performed by the IP packet processor 116 and the VPN packet processor 140 of the gateway apparatus 100.

Referring to FIG. 13A, at Step 1002, the IP packet processor 116 or the VPN packet processor 140 refer to the VPN connection management information storage section 156 via the VPN connection information management section 132, and identify the protocol of a packet provided to the IP packet processor 116. At Step 1004, the IP packet processor 116 or the VPN packet processor 140 determines whether the packet is a VPN packet. If it is determined that the packet is not a VPN packet, the IP packet processor 116 at Step 1006 processes the packet in a conventional manner, where the conventional packet processing is performed on a packet other than a VPN packet by the gateway apparatus 100.

If it is determined that the packet is a VPN packet, the VPN packet processor 140 at Step 1008 refers to the VPN connection management information 156 via the VPN connection information management section 132, and identifies the source address of the packet.

Referring to FIG. 13B, at Step 1008, the VPN packet processor 140 determines whether the source address of the input packet is of an external terminal in the VPN connection.

If it is determined at Step 1010 that the address is not of an external terminal, the VPN packet processor 140 refers to the VPN connection management information 156 via the VPN connection information management section 132, and identifies the source address of the input packet. At Ste 1012, the VPN packet processor 140 determines whether the source address is of a home appliance as the destination for the VPN connection or to be connected with over the VPN.

If it is determined that the address is not of a home appliance as a destination for the VPN connection, the IP packet processor 116 at Step 1014 performs the conventional IP packet processing.

If it is determined at Step 1012 that the address is of a home appliance as a destination for the VPN connection, the VPN packet processor 140 at Step 1016 rewrites the source address of the packet into the global IP address of the gateway apparatus 100, and then transmits the packet to the Internet 50. At Step 1030, the VPN packet processor 140 records the VPN packet transmission and reception time and the like into the VPN connection management information storage section 156 via the VPN connection information management section 132, and thereby updates the time of the last transmission and reception as illustrated in FIG. 12. Then, the procedure exits from the routine of FIG. 13B.

If it is determined at Step 1008 that the address is of an external terminal, the VPN packet processor 140 at Step 1020 refers to the VPN connection management information storage section 156 and identifies a destination for the VPN connection. At Step 1022, the VPN packet processor 140 determines whether the destination for the VPN connection is the gateway apparatus 100.

If it is determined that the destination is the gateway apparatus 100, the VPN packet processor 140 at Ste 1026 transfers the packet to the VPN server 142 in the gateway apparatus 100. Then, the procedure goes to Ste 1030.

If it is determined at Step 1022 that the destination is not the gateway apparatus 100, the VPN packet processor 140 at Step 1024 refers to the VPN connection management information storage section 156, rewrites the destination address in the packet into the private IP address on the LAN 10, and then transmits the packet over the LAN 10 to the home appliance (102) as the destination. Then, the procedure goes to Step 1030.

In accordance with the embodiments described above, before connecting to the gateway apparatus 100, the remote terminal 400 is authenticated for security by the authentication server 300 beforehand. This avoids the necessity of second authentication by the gateway apparatus 100.

Alternatively, without the intervention by the authentication server 300, the gateway apparatus 100 and the remote terminal 400 may exchange messages, which are preferably encrypted, by electronic mail over the Internet 50 or through the telephone line, and thereby exchange the above-described information required for the remote terminal 400 to access any one of the home appliances 102-106 and the VPN server 142 via the gateway apparatus 100.

More particularly, for accessing any one of the home appliances 102-106 and the VPN server 142, the remote terminal 400 may transmit beforehand to the gateway apparatus 100 a message for requesting the transmission of the URI of the gateway apparatus 100. The message may include information required for the authentication of the remote terminal 400. In this case, the gateway apparatus 100 in place of the authentication server 300 performs the authentication of the remote terminal 400. In response to the request, the gateway apparatus 100 may transmit a message containing the above-mentioned URI to the remote terminal 400. Alternatively, at each time that the global IP address is changed, the gateway apparatus 100 may transmit a message containing the URI to the remote terminal 400. The remote terminal 400 accesses the gateway apparatus 100 using this URI in a similar manner as described above.

According to the embodiments described above, a virtual private network connecting function is provided in the gateway apparatus 100. This allows the remote terminal 400 on the Internet 50 to connect virtually to the internal network 10 via the gateway apparatus 100 and thereby use a service originally available on the internal network 10.

Further, by associating the VPN connection with the processing of remote access, sufficient security is ensured without performing authentication dedicated only for the VPN connection. Furthermore, the gateway apparatus 100 can manage different VPN connection conditions, so that it can avoid complicated settings therein and perform simple packet processing limited to the VPN connection to be used. Thus, the user's time and work necessary is minimized.

The above-described embodiments are only typical examples, and their modifications and variations are apparent to those skilled in the art. It should be noted that those skilled in the art can make various modifications to the above-described embodiments without departing from the principle of the invention and the accompanying claims.

What is claimed is:

1. A gateway apparatus capable of connecting to an internal network and an external network, comprising:
    an information management unit for managing a global IP address of the gateway apparatus and identification information that is used to permit an external device connecting to the external network to connect to the internal network, wherein the information management unit transmits the global IP address and the identification information over the external network to an external apparatus;
    a remote service processor for generating a one-time password, wherein the information management unit, in response to a request received over the external network, transmits the one-time password generated by the remote service processor over the external network to the external apparatus;

a connector unit for permitting the external device to connect to the internal network, when it receives a URI containing the global IP address and the transmitted one-time password from the external device to be permitted to connect over the external network; and an address converter unit for converting an IP address for the external network into an IP address for the internal network and converting an IP address for the internal network into an IP address for the external network, wherein the connector unit transmits a search message over the internal network to a plurality of internal devices configured to the internal network, then receives response messages from ones of the plurality of internal devices configured to form a virtual private network, and transmits information representative of a list of the internal devices, from which the gateway apparatus has received the response messages, to the external device having transmitted the URI.

2. A gateway apparatus according to claim 1, wherein the global IP address of the gateway apparatus is dynamically assigned by an Internet service provider, and the external apparatus is an authentication server for authenticating the external device to be permitted to connect, wherein a fixed global IP address is assigned to the authentication server.

3. A gateway apparatus according to claim 2, wherein the connector unit transmits a search message over the internal network to a plurality of devices configured to the internal network, then receives response messages from ones of the plurality of devices configured to form a virtual private network, and transmits information representative of a list of the plurality of devices configured to form a virtual private network to the external device having transmitted the URI.

4. A gateway apparatus according to claim 1, wherein the address converter unit extracts packets transferred only between the external device permitted to connect by the connector unit and a device configured to the internal network, and converts the IP addresses of the packets.

5. A gateway apparatus according to claim 2, wherein the address converter unit extracts packets transferred only between the external device permitted to connect by the connector unit and a device configured to the internal network, and converts the IP addresses of the packets.

6. A gateway apparatus according to claim 1, wherein when the transfer of a packet does not occur for a predetermined period of time between the external device permitted to connect by the connector unit and a device configured to the internal network, the connector unit releases the connection between the external device permitted to connect by the connector unit and the internal network.

7. A gateway apparatus according to claim 2, wherein when the transfer of a packet does not occur for a predetermined period of time between the external device permitted to connect by the connector unit and a device configured to the internal network, the connector unit releases the connection between the external device permitted to connect by the connector unit and the internal network.

8. A gateway apparatus according to claim 4, wherein when the transfer of a packet does not occur for a predetermined period of time between the external device permitted to connect by the connector unit and a device configured to the internal network, the connector unit releases the connection between the external device permitted to connect by the connector unit and the internal network.

9. A gateway apparatus according to claim 1, wherein after the connection between the external device having transmitted the URI and a device configured to the internal network is released, the address converter unit releases the conversion of IP addresses of packets transferred between the external device having transmitted the URI and the device configured to the internal network.

10. A gateway apparatus according to claim 2, wherein after the connection between the external device having transmitted the URI and a device configured to the internal network is released, the address converter unit releases the conversion of IP addresses of packets transferred between the external device having transmitted the URI and the device configured to the internal network.

11. A gateway apparatus according to claim 4, wherein after the connection between the external device having transmitted the URI and a device configured to the internal network is released, the address converter unit releases the conversion of IP addresses of packets transferred between the external device having transmitted the URI and the device configured to the internal network.

12. A gateway apparatus according to claim 6, wherein after the connection between the external device having transmitted the URI and a device configured to the internal network is released, the address converter unit releases the conversion of IP addresses of packets transferred between the external device having transmitted the URI and the device configured to the internal network.

13. A non-transitory storage medium storing a program thereon that causes a gateway apparatus, which is capable of connecting to an internal network and an external network, to execute:

transmitting, over the external network to an external apparatus, a global IP address of the gateway apparatus and identification information that is used to permit an external device connecting to the external network to connect to the internal network;

generating a one-time password;

transmitting the generated one-time password over the external network to the external apparatus in response to a request received over the external network;

permitting the external device to connect to the internal network, when a URI containing the global IP address and the transmitted one-time password is received from the external device to be permitted to connect over the external network;

converting an IP address for the external network into an IP address for the internal network and converting an IP address for the internal network into an IP address for the external network; and transmitting a search message over the internal network to a plurality of internal devices configured to the internal network, then receiving response messages from ones of the plurality of internal devices configured to form a virtual private network, and transmitting information representative of a list of the internal devices, from which the gateway apparatus has received the response messages, to the external device having transmitted the URI.

14. A method of operating a gateway apparatus, which is capable of connecting to an internal network and an external network, the method comprising:

transmitting, over the external network to an external apparatus, a global IP address of the gateway apparatus and identification information that is used when an external device on the external network attempts to connect to the internal network;

generating a one-time password;

transmitting the generated one-time password over the external network to the external apparatus in response to a request received over the external network;

permitting the external device to connect to the internal network, when a URI containing the global IP address and the transmitted one-time password is received from the external device as part of an attempt by the external device to connect over the external network to a home device on the internal network;

converting an IP address couched in a protocol of the external network and identifying the home device into an IP address couched in a protocol of the internal network, and converting an IP address couched in the protocol of the internal network into an IP address couched in the protocol of the external network; and transmitting a search message over the internal network to a plurality of internal devices configured to the internal network, then receive response messages from ones of the plurality of internal devices configured to form a virtual private network, and transmit information representative of a list of the internal devices, from which the gateway apparatus has received the response messages, to the external device having transmitted the URI.

\* \* \* \* \*